C. RADIGUER.
EXCESS LUBRICANT COLLECTING MEANS FOR ENGINE CYLINDERS.
APPLICATION FILED FEB. 1, 1915.
1,143,914. Patented June 22, 1915.
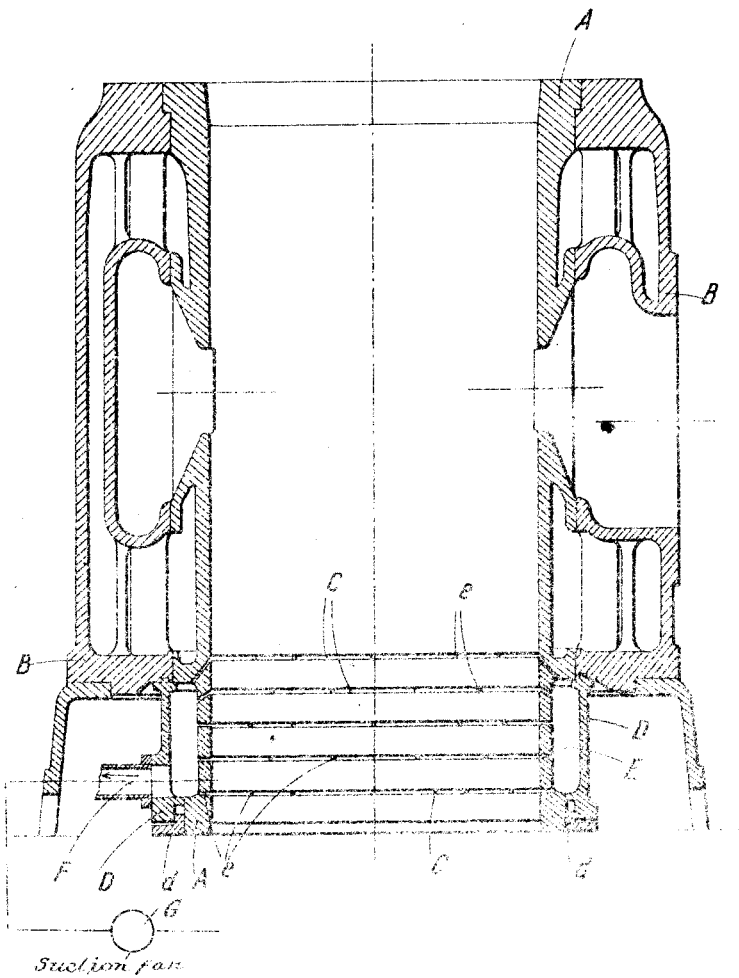

UNITED STATES PATENT OFFICE.

CHARLES RADIGUER, OF ST.-DENIS, FRANCE, ASSIGNOR TO THE SOCIETE ANONYME DES ETABLISSEMENTS DELAUNAY-BELLEVILLE, OF ST.-DENIS, FRANCE, A CORPORATION OF FRANCE.

EXCESS-LUBRICANT-COLLECTING MEANS FOR ENGINE-CYLINDERS.

1,143,914. Specification of Letters Patent. Patented June 22, 1915.

Application filed February 1, 1915. Serial No. 5,559.

*To all whom it may concern:*

Be it known that I, CHARLES RADIGUER, citizen of the French Republic, residing at St.-Denis, Department of the Seine, in France, have invented certain new and useful Improvements in Excess-Lubricant-Collecting Means for Engine-Cylinders; and I do hereby declare the following to be a full, clear, and exact description of the invention, such as will enable others skilled in the art to which it appertains to make and use the same.

This invention relates to internal combustion engines, and has for its object to provide means for withdrawing the excess of lubricating oil from the lower part of the engine cylinder. In furtherance of this object, the invention consists in providing a plurality of circumferential grooves in the inner surface of the lower part of each engine cylinder, which grooves serve to collect the excess lubricant which is then withdrawn by means of a suction fan or similar device, and subsequently returned to the crank case of the engine.

The invention is illustrated in the accompanying drawing illustrating in vertical section, the cylinder of a single-acting two-cycle combustion engine provided with the improved means for conducting away the excess lubricant.

Referring to the drawing, the engine cylinder is represented at B, the inner sleeve A of which has a lower extension, as clearly shown in the drawing, to permit the provision of a plurality of circumferential grooves C. A collar D encircles the lower portion of the sleeve A, and forms with said lower portion of the sleeve A, a fluid-tight compartment E. The compartment is rendered fluid-tight at its lower portion by means of an annular packing $d$. Each of the circumferential grooves C is placed in communication with the fluid-tight compartment E by a plurality of small passages $e$ spaced circumferentially of the groove. The passages $e$ of all of the grooves are preferably arranged in quincunx.

The compartment E preferably communicates with a suction fan, or other suction-producing apparatus, by means of a conduit F.

The suction produced in the conduit F and the fluid-tight compartment obviously withdraws the lubricant collected in the grooves C, which lubricant may be returned to the crank case, if so desired, or to any other suitable part of the engine, where it may be again circulated to perform its lubricating function.

The means above described for withdrawing the excess lubricant retains the lubricant in the lower part of the cylinder and prevents the same from causing oily deposits in the upper part of the cylinder and on the pistons. Furthermore, as the lubricant is retained at the lower part of the cylinder, the usual waste of oil conducted to the upper part of the cylinder is eliminated.

Obviously numerous modifications and changes may be made in the details of the construction, without departing from the spirit or scope of the invention, as defined in the accompanying claims.

What I claim is:—

1. In a combustion engine, the combination of a cylinder provided on its inner wall with a lubricant collecting groove, and suction-producing means to withdraw the lubricant collected in said groove.

2. In a combustion engine, the combination of a cylinder provided on its inner wall with a plurality of circumferential lubricant collecting grooves, a lubricant chamber, the cylinder having a plurality of passages for conducting the lubricant collected in each of said grooves to said chamber, and suction-producing means to withdraw the lubricant from said chamber and from said grooves.

3. In a combustion engine, the combination of a cylinder provided on its inner wall with a plurality of circumferential lubricant collecting grooves, a collar surrounding that part of the cylinder provided with such grooves and forming with the cylinder a fluid-tight chamber, the cylinder having a plurality of passages placing each of said grooves in communication with said chamber, and suction-producing means in communication with said chamber.

In testimony whereof I affix my signature, in presence of two witnesses.

C. RADIGUER.

Witnesses:
 HENRI COHEN,
 DE WITT C. POOLE, Jr.